No. 625,610. Patented May 23, 1899.
H. SMITH.
NUT LOCK.
(Application filed Jan. 12, 1899.)

(No Model.)

Witnesses:
W. W. Truitt.
W. E. Van Wert.

Inventor.
Hugh Smith
by Frederick W. Cameron
Atty.

UNITED STATES PATENT OFFICE.

HUGH SMITH, OF WATERVLIET, NEW YORK.

NUT-LOCK.

SPECIFICATION forming part of Letters Patent No. 625,610, dated May 23, 1899.

Application filed January 12, 1899. Serial No. 701,940. (No model.)

*To all whom it may concern:*

Be it known that I, HUGH SMITH, a citizen of the United States of America, and a resident of the city of Watervliet, county of Albany, State of New York, have invented certain new and useful Improvements in Nut-Locks, of which the following is a specification.

My invention relates to improvements in nut-locks; and the object of my invention is to provide a strong, positive, and economical nut-lock particularly adapted for use in connection with the fish-plates on rail-joints. I attain this object by means of the mechanism illustrated in the accompanying drawings, in which—

Figure 1:
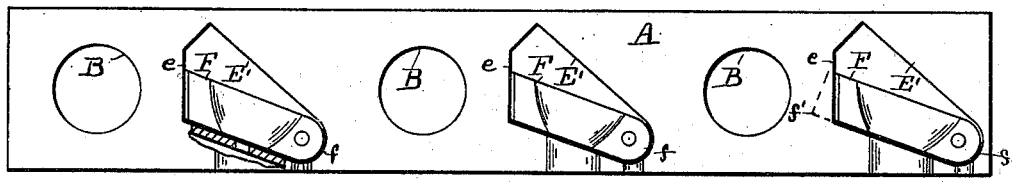
Figure 2:
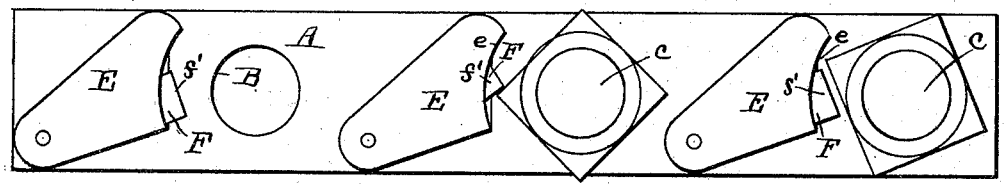
Figure 3:
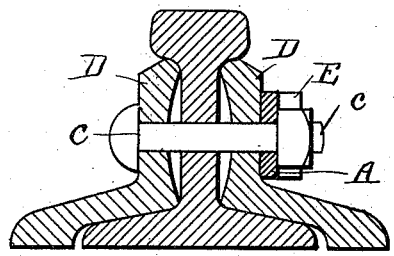

Figure 1 is a rear elevation of my plate. Fig. 2 is a front elevation of the plate, showing the position of the bolts. Fig. 3 is a cross-section of the plate A in connection with the fish-plate on a rail.

Similar letters refer to similar parts throughout the several views.

Through the plate A, I have holes B B, usually constructing three holes in each plate, this being the number which is usually necessary, for the passage of the bolts C C through the rail. When thus arranged, the plate A is adapted for a washer in connection with the fish-plate D. The plate A has cast therein recesses E' E', forming on the opposite side of the plate corresponding projections E E, within which recesses E' E', on the rear side of the plate—that which is placed next the fish-plate—I place a locking-bar F, said locking-bar lying loose in the said openings and preferably provided with an upper feather-edge for the purpose of allowing such dirt as may enter through the openings e to escape from the opening in the projections E E. The locking-bar F is so arranged that at its lower end, as at $f$, it rests upon the lowest portion of the opening E', its opposite end $f'$ projecting through the opening $e$ in the projection E and extending slightly beyond said projection when in its normal position, but is capable of movement to such an extent that the bar may almost entirely be inclosed within the projection E when raised. The projections E E are arranged, substantially as shown in the drawings, adjacent to the openings B B, through which the bolts C C pass. When the nut on the bolt C is screwed in position, the corner of the nut will strike the projecting portion $f'$ on the bar F and force it into the projection E until the corner of the nut passes said projecting part $f'$ of the bar, when gravity will cause the bar to fall down, occupying the position shown at the extreme right of Fig. 2. When the nut has been screwed tightly in place and occupies the position shown in the extreme right of Fig. 2, it is apparent that it cannot become loosened, because of the projecting portion $f'$ of the locking-bar F, which offers an obstruction and absolutely prevents the reverse rotation of the nut. On the other hand, when it is advisable to tighten the nut this can be done at any time without any inconvenience or manipulation of the locking-bar F, except such as is imparted thereto in operating the nut.

It is of great advantage to have the plate arranged in such a manner that three bolts are provided for in one plate, since it saves considerable time and expense and is more efficient.

In operation I prefer to use two plates in connection with the rails—that is, one plate for each rail. This is for the purpose of allowing for the expansion and contraction of the rail. The fish-plates having elongated holes for the passage of the bolts C C, the rails are free to move under expansion and contraction. The plate A being secured tightly to the bolt, expansion and contraction of the rail will tend to tear away the plate if I use but one plate instead of two.

The operation of my invention is apparent. Bolts are placed through the fish-plate. The plate A, containing the locking-bar F, is placed on the bolts. The nuts are then tightened up securely, and without any further manipulation of locking mechanism the nuts are positively prevented from loosening.

What I claim as my invention, and desire to secure by Letters Patent, is—

1. In a nut-lock, a plate provided with a recess; a locking-bar placed therein, one end of said locking-bar projecting slightly from said recess, said locking-bar feather-edged along the upper portion thereof, substantially as described.

2. A nut-lock comprising a plate provided with an opening for a bolt; a recessed projection on said plate; a locking-bar placed in said recessed projection, entirely covered and protected by said recessed projection, except at the end thereof, from which said locking-bar protrudes a short distance, all so arranged that when the bolt is placed through said opening, the nut thereon will be prevented from rotating in a direction which tends to loosen the nut because of the intervention of said locking-bar, substantially as described.

Signed by me, at Watervliet, New York, this 1st day of January, 1899.

HUGH SMITH.

Witnesses:
JOHN D. JAQUINS,
CHARLES H. MORS.